United States Patent
Ahuja et al.

(10) Patent No.: US 7,379,443 B2
(45) Date of Patent: May 27, 2008

(54) METHOD OF DYNAMIC MANAGEMENT OF A VIRTUAL LOCAL AREA NETWORK (VLAN) IN A WIRELESS AD HOC NETWORK

(75) Inventors: Ramandeep Ahuja, Chicago, IL (US); Mario F. Derango, Cary, IL (US); Surender Kumar, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 518 days.

(21) Appl. No.: 10/892,758

(22) Filed: Jul. 16, 2004

(65) Prior Publication Data

US 2006/0013171 A1    Jan. 19, 2006

(51) Int. Cl.
*H04Q 7/24* (2006.01)

(52) U.S. Cl. ............... 370/338; 370/328; 370/331; 370/351; 455/411; 455/435.1

(58) Field of Classification Search ..... 455/435.1–435, 455/445, 448, 403, 410–411; 370/338, 328, 370/389, 395.53, 316, 323, 325, 352, 329, 370/390, 351, 431, 254; 709/203, 238
See application file for complete search history.

(56) References Cited

U.S. PATENT DOCUMENTS

| | | | | | |
|---|---|---|---|---|---|
| 5,825,772 | A | * | 10/1998 | Dobbins et al. | 370/396 |
| 6,041,358 | A | * | 3/2000 | Huang et al. | 370/331 |
| 6,128,665 | A | * | 10/2000 | Iturralde | 370/401 |
| 6,304,556 | B1 | * | 10/2001 | Haas | 370/254 |
| 6,980,537 | B1 | * | 12/2005 | Liu | 370/338 |
| 7,016,306 | B2 | * | 3/2006 | Alapuranen et al. | 370/238 |
| 7,139,262 | B1 | * | 11/2006 | Elliott | 370/351 |
| 7,177,295 | B1 | * | 2/2007 | Sholander et al. | 370/338 |
| 7,317,918 | B2 | * | 1/2008 | Ahuja et al. | 455/445 |
| 2002/0052972 | A1 | * | 5/2002 | Yim | 370/254 |
| 2003/0123419 | A1 | * | 7/2003 | Rangnekar et al. | 370/338 |
| 2004/0028058 | A1 | * | 2/2004 | Katoh | 370/395.53 |
| 2004/0125803 | A1 | * | 7/2004 | Sangroniz et al. | 370/390 |
| 2004/0214572 | A1 | * | 10/2004 | Thompson et al. | 455/435.2 |

* cited by examiner

*Primary Examiner*—George Eng
*Assistant Examiner*—Kamran Afshar
(74) *Attorney, Agent, or Firm*—Terri S. Hughes; Valerie M. Davis (57) ABSTRACT

In a wireless ad hoc network comprising a plurality of nodes (102), when a method of the present invention determines that a source node and a destination node belong to a common virtual local area network (VLAN), information is routed to the destination node using only nodes that belong to the common VLAN. If a path is not available to route the information between the source node and the destination node using only nodes that belong to the common VLAN, a default VLAN is used to route the information at least partially through the ad hoc network. If, however, the method of the present invention determines that the source node belongs to a first VLAN and the destination node belongs to a second VLAN, the source node or an intermediate node registers with the second VLAN and continues routing the information using nodes that belong to the second VLAN.

17 Claims, 5 Drawing Sheets

METHOD OF DYNAMIC MANAGEMENT OF A VIRTUAL LOCAL AREA NETWORK (VLAN) IN A WIRELESS AD HOC NETWORK

FIELD OF THE INVENTION

The present invention relates generally to a method of dynamically managing a virtual local area network in a wireless ad hoc network.

BACKGROUND OF THE INVENTION

A wireless ad hoc network (an example illustrated in FIG. 1) is a collection of nodes that communicate by forming a multi-hop radio network without the need of a infrastructure. Nodes in an ad hoc network forward information (e.g., frames) to other nodes by selecting one of the available routes to the destination node based on several parameters, such as link quality, round trip time, etc. Generally ad hoc nodes do not have a fixed topology, but ad hoc networks can be fixed and perform multi-hopping. Nodes can join the ad hoc network and leave dynamically, and the ad hoc networks can vary in the degree of mobility. The ad hoc network heals itself by selecting alternate routes to the destination node, and each node in an ad hoc network can be viewed as a router. The dynamic formation of ad hoc networks, the ability to setup a network anywhere without the need of infrastructure, and the self healing characteristic make the ad hoc network very necessary for situations, such as public safety incident scenes, where infrastructure connectivity (e.g., access points) might not be available.

In the case of an incident scene, wireless ad-hoc networks allow public safety agencies to communicate without the dependence on an infrastructure. One of the problems with using a wireless ad hoc network, for example at an incident scene, is the ability to prevent information from hopping (i.e., being routed) through a single bottleneck node. Nodes which are not part of a communication dialog between another set of nodes may become a bottleneck node and may have little or no bandwidth available to make any emergency calls for itself; the bottleneck node in such a case ends up forwarding information for other nodes. Although the advantage of ad hoc networks is for information to hop through any available node, this does pose a serious problem in a large, dense ad hoc network.

Thus, there exists a need for minimizing the likelihood of a node becoming a bottleneck node and forwarding information for other nodes.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

The present invention provides dynamic management of virtual local area networks (VLANs) in a wireless ad hoc network to enhance utilization of bandwidth, and conserve node battery; in other words, the present invention routes unicast/multicast messages through a particular VLAN in a wireless ad hoc network to preserve other nodes' battery life (to prevent a node belonging to a different VLAN from draining its battery on information it does not care about) and bandwidth conservation. VLANs in a wireless ad hoc network offer a logical segmentation of the network by containing the traffic flow originating from nodes belonging to a VLAN to preferably flow within that VLAN to arrive at the destination. The present invention provides dynamic merging and formation of a wireless ad hoc VLAN as a means to segregate traffic within an ad hoc network based on functionality, location, users, or the like, thus minimizing the likelihood of a node becoming a bottleneck node and forwarding information for other nodes. Let us now refer to the figures to describe the present invention in greater detail. It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

Figure 1:
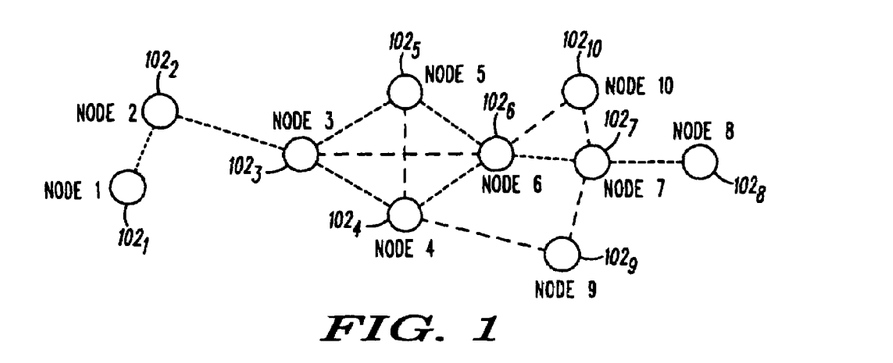
FIG. 1 (prior art) illustrates a typical wireless ad hoc network.
Figure 2:
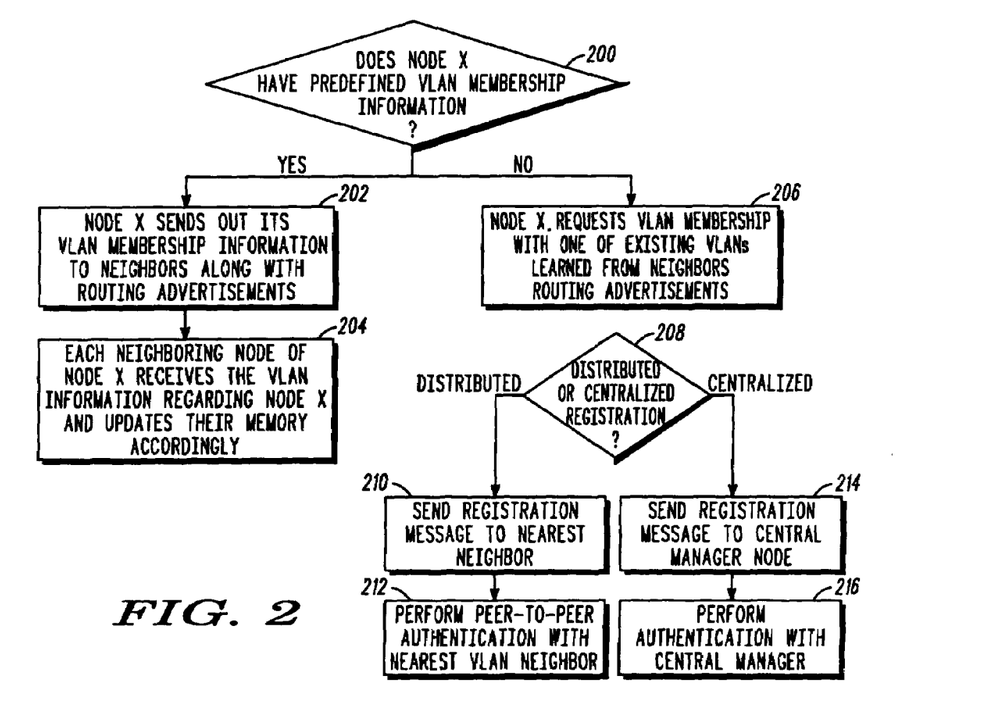
FIG. 2 illustrates a flowchart of a node in the wireless ad hoc network of FIG. 1 joining to a VLAN in accordance with the present invention.

Referring to FIG. 2, in accordance with the present invention, each node 102 in the ad-hoc network of FIG. 1 determines whether it has a predefined VLAN membership (e.g., stored on a file located in the node, hard-coded in the node, or the like; step 200). Preferably, node $102_x$ determines whether it has a predefined VLAN membership upon power up (e.g., hard reset, soft reset, re-initialization, or the like), however, this determination may take place at any time. If node $102_x$ determines that it does have a predefined VLAN membership, node $102_x$ transmits its VLAN membership information (e.g., its profile) to its neighboring nodes in the ad hoc network preferably along with routing advertisements (step 202). For ease of simplicity and clarity, the present invention refers to a neighboring node of node $102_x$ as any node that is one "hop" away from node $102_x$ and within transmitting/receiving distance of node $102_x$. As a result, each node 102 in the ad hoc network receives the VLAN membership information for each of its neighboring nodes and updates their memory accordingly (step 204).

If node $102_x$, however, determines that it does not have a predefined VLAN membership (step 200), node $102_x$ requests a VLAN membership with one of the existing VLANs present in the ad hoc network (step 206). In the preferred embodiment of the present invention, each node 102 in the ad hoc network becomes aware of the existing VLANs present in the ad hoc network via the VLAN membership information and/or routing advertisements it receives from its neighboring nodes, however, there are other ways for a node 102 to learn this information that will become obvious to those individuals of ordinary skill in the art.

Once node $102_x$ determines that it must request a VLAN membership, node $102_x$ determines whether the ad hoc network is setup to perform distributed registration or centralized registration (step 208). If the ad hoc network is setup to perform distributed registration, node $102_x$ sends a VLAN registration request to node $102_y$ belonging to the VLAN in which it wants to become a member (step 210). Upon receipt of the request, node $102_y$ determines whether node $102_x$ is allowed to join the VLAN via a known peer-to-peer security mechanism (e.g., MAC address; step 212). Upon successful authentication, node $102_y$ grants node $102_x$ permission to join the VLAN.

If the ad hoc network, however, is set up to perform central registration, node $102_x$ sends a VLAN registration request to an advertised central managing node (step 214). Node $102_x$ performs authentication with the central managing node using a known security mechanism (e.g., checking its MAC address or the like; step 216). Upon successful authentication, the central managing node grants node $102_x$ permission to join the VLAN.

Figure 3:
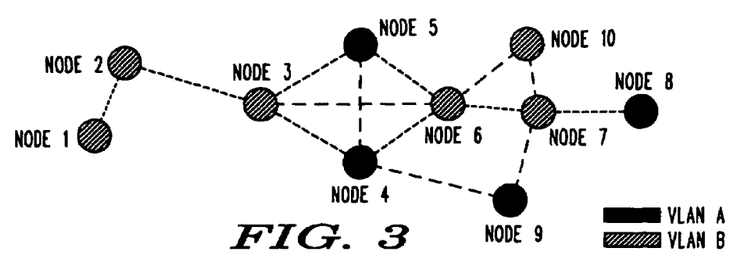
FIG. 3 illustrates the wireless ad hoc network of FIG. 1 with VLAN membership for each node in the wireless ad hoc network in accordance with the present invention.

FIG. 3 illustrates an example of the ad hoc network of FIG. 1 with nodes 102 belonging to one of two different VLANS (VLAN A and VLAN B). As illustrated in the figure, nodes 4, 5, 8 and 9 belong to VLAN A, while nodes 1, 2, 3, 6, 7, and 10 belong to VLAN B. As noted above, the dashed lines between the nodes indicate that a physical communication path exists between the nodes.

Figure 4:
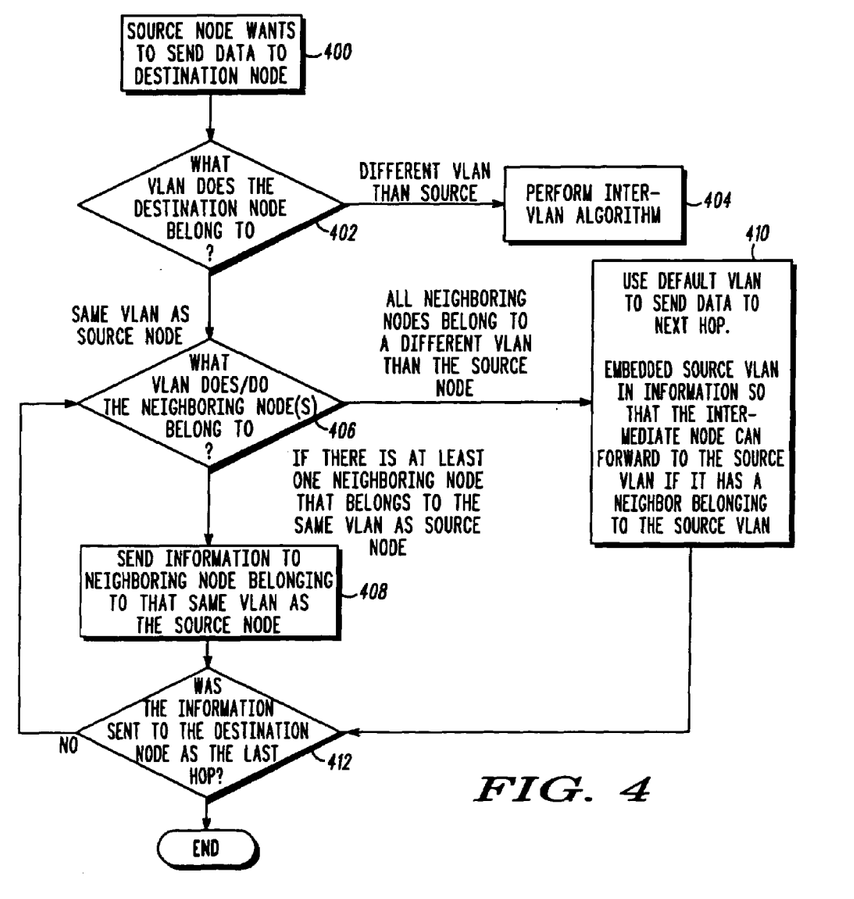
FIG. 4 illustrates a flowchart of a routing algorithm for a node in the wireless ad hoc network of FIG. 3 in accordance with the present invention.

Let us now refer to FIG. 4. FIG. 4 illustrates a flowchart of a routing algorithm for a node 102 in the ad hoc network of FIG. 3 in accordance with the preferred embodiment of the present invention. As illustrated, a source node performs the routing algorithm of FIG. 4 when it desires to send information (e.g., voice, data, etc.) to a destination node in the ad hoc network (step 400). In accordance with the present invention, the source node determines the VLAN membership of the destination node (step 402). If the source node determines that the destination node does not belong to the same VLAN as the source node, the source node performs an inter-VLAN routing algorithm as described below in the discussion of FIG. 7 (step 404).

If the source node, however, determines that the destination node belongs to the same VLAN as the source node (at step 402), the source node may implement one of two embodiments of the present invention depending on system designs. In accordance with a first embodiment of the present invention, the source node determines the VLAN membership of its neighboring nodes (at step 406). After determining the VLAN membership of all its neighboring nodes (at step 406), the source node routes the information to a neighboring node belonging to the same VLAN as the source and destination nodes, if such a node exists (at step 408). If the source node does not have a neighboring node that belongs to the same VLAN, the source node transmits the information to a neighboring node belonging to a different VLAN under the guise of a default VLAN as described below (at step 410). It is important to note that all nodes in the ad hoc network are predefined to have an automatic membership to the default VLAN. The neighboring node that received the information from the source node repeats the process by determining the VLAN membership of its neighboring nodes and routing the information further through the ad hoc network to one of its neighboring nodes belonging to the same VLAN as the source and destination nodes, if such a node exists; using only the default VLAN if there are no neighboring nodes belonging to the same VLAN as the source and destination nodes. This process continues (starting at step 406) until the information finally reaches the destination node (at step 412). It is important to note that the present invention preferably does not allow a node to route the information to a node in which it received the information from (also known as loop-free routing to those skilled in the art). It should be further noted that if the source node has more than one neighboring node that belongs to the same VLAN as itself, or if the source node uses the default VLAN, the source node selects the node based on at least one of the following parameters: proximity to the destination node, radio frequency characteristics of the node, signal to noise ratio, congestion/delay characteristics, or the like.

Alternatively, in a second embodiment, if the source node determines that the destination node belongs to the same VLAN as the source node, the source node determines the VLAN membership of at least a portion of all the nodes in the ad hoc network that could be used to route the information to the destination node; the source node can determine the VLAN membership of the nodes that could be used to route the information to the destination node in a variety of ways that will be obvious to an individual of ordinary skill in the art by using proactive routing protocols, such as a destination sequenced distance vector (DSDV) protocol or the like. The source node then determines whether there is a route available through the ad hoc network to the destination node using only nodes belonging to the same VLAN as the source and destination nodes. If a route from the source node to the destination node is available through the ad hoc network using only nodes belonging to the same VLAN, the source node selects that route as the desired route, and the nodes route the information to the destination node along the desired route. If more than one route is available through the ad hoc network using only nodes belonging to the same VLAN as the source and destination nodes, the source node preferably selects the shortest route as the desired route. Thus, it is important to note that the source node will always select a route from the source node to the destination node as the desired route using only nodes belonging to the same VLAN as the source and destination nodes if such a route exists, even if there is a shorter route available from the source node to the destination node using nodes belonging to multiple VLANs. If a route from the source node to the destination node is not available through the ad hoc network using nodes belonging to same VLAN as the source and destination nodes, the source node or a selected intermediate node performs an inter-VLAN routing algorithm as described below in the discussion of FIG. 7.

Before we discuss the inter-VLAN routing algorithm in accordance with the present invention, let us first describe the default VLAN and look at some examples of the nodes 102 implementing the routing algorithm described above in FIG. 4. With respect to the default VLAN as noted above, all nodes in the ad hoc network are predefined to have an automatic membership to the default VLAN. In accordance with the present invention, a node only sends information to a neighboring node if the node and the neighboring node belong to the same VLAN; if a node sends information to a neighboring node that belongs to a different VLAN than the node, the neighboring node ignores the information (i.e., not process and/or forward the information). In accordance with the present invention, a node uses the default VLAN to send information to a neighboring node when it has no neighboring nodes that belong to the same VLAN as itself and that VLAN is the desired VLAN in which to route the information through the ad hoc network; as such, when the neighboring node (that belongs to a different VLAN) notices that the information was sent using the default VLAN, the neighboring node processes and/or forwards the information as opposed to ignoring the information. Moreover, when a node uses the default VLAN to send information, the desired VLAN in which to send the information through the ad hoc network is embedded in the information (e.g., via a VLAN identifier, a source identifier, a destination identifier, or the like). Embedding the desired VLAN in the information enables a node that does not belong to the desired VLAN to send the information to a neighboring node that does belong to the desired VLAN, if such a node exists, in order to keep the information flowing through the ad hoc network in the desired VLAN as much as possible. As such, the node that does not belong to the desired VLAN uses the default VLAN to send the information to its neighboring node that does belong to the desired VLAN, if such a node exists; otherwise, the node sends the information to a neighboring node as described above in FIG. 4 within the undesired VLAN until a node belonging to the desired VLAN becomes a neighboring node.

Alternatively, the node that does not belong to the desired VLAN sends the information to its neighboring node that does belong to the desired VLAN, if such a neighboring node exists, without using the default VLAN. In this scenario, the neighboring node parses the header of the information and determines that even though the last sender of the information belongs to a different VLAN, the desired VLAN is the VLAN in which it belongs, and as such, processes the information accordingly.

Moving on to some examples of the nodes 102 implementing the routing algorithm described above in FIG. 4, FIG. 5 illustrates an example where the source node, the destination node, and all the intermediate nodes in the ad hoc network used to route the information from the source node to the destination node belong to the same VLAN. In this example, in accordance with the first embodiment of the present invention, the source node $102_1$ desires to send information to the destination node $102_{10}$. The source node $102_1$ determines the VLAN membership of the destination node $102_{10}$, and the VLAN membership of each of its neighboring nodes in the ad hoc network. In this embodiment of this example, the only neighboring node for the source node $102_1$ is node $102_2$. The source node $102_1$ identifies that node $102_2$ also belongs to VLAN B, thus forwards the information to node $102_2$.

Figure 5:
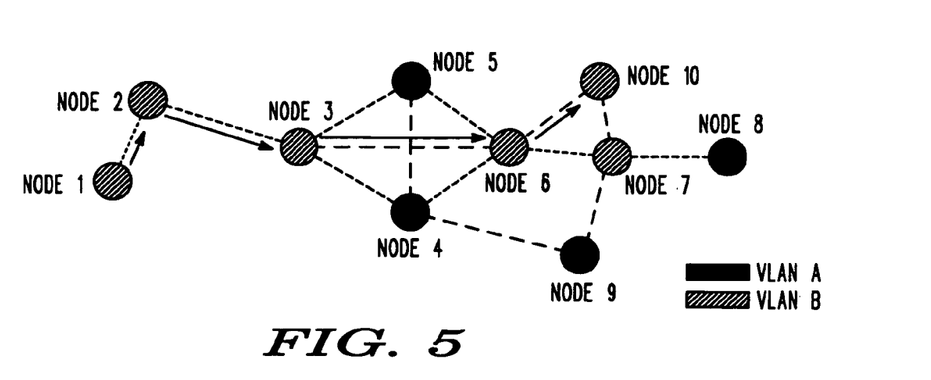
FIG. 5 illustrates an example of routing information through the wireless ad hoc network of FIG. 3, wherein all the nodes belong to the same VLAN in accordance with the present invention.

Node $102_2$ now identifies the VLAN membership of its neighboring nodes: node $102_1$ and node $102_3$. Node $102_2$ identifies that both node $102_1$ and node $102_3$ belong to VLAN B, however, node $102_2$ forwards the information to node $102_3$ to avoid sending the information back to the node in which the information was received (also known as loop-free routing to those skilled in the art).

Upon receipt of the information, node $102_3$ identifies the VLAN membership of its neighboring nodes: node $102_2$, node $102_4$, node $102_5$ and node $102_6$. Node $102_3$ determines that node $102_2$ and node $102_6$ belong to VLAN B, and node $102_4$ and node $102_5$ belong to VLAN A. In accordance with the present invention, node $102_3$ forwards the information to node $102_6$ since node $102_6$ is its only neighboring node that belongs to the same VLAN as the source and destination nodes (in this case, VLAN B) and is not the last sender of the information.

Once node $102_6$ receives the information, node $102_6$ identifies that the destination node $102_{10}$ is one of its neighboring nodes and identifies that the destination node $102_{10}$ belongs to the same VLAN. As a result, node $102_6$ forwards the information directly to the destination node $102_{10}$. As such, the information from the source node $102_1$ to the destination node $102_{10}$ was routed through the ad hoc network using only nodes belonging to the same VLAN.

In a second embodiment of this example, instead of the source node $102_1$ and each intermediate node 102 determining the VLAN membership of their respective neighboring nodes and routing the information in an "ad hoc" fashion as described in the first embodiment, the source node $102_1$ determines the VLAN membership of at least a portion of the nodes in the ad hoc network and selects the desired route in which the information is routed. As such, in the second embodiment of the example illustrated in FIG. 5, the source node $102_1$ determines the VLAN membership of all the nodes 102 in the ad hoc network. The source node $102_1$ determines that the destination node $102_{10}$ belongs to VLAN B as well as itself and nodes $102_2$, $102_3$, $102_6$ and $102_7$. The source node $102_1$ further determines that there are at least two routes available through the ad hoc network using only nodes belonging to VLAN B (the same VLAN): using nodes $102_1$-$102_2$-$102_3$-$102_6$-$102_{10}$ and using nodes $102_1$-$102_2$-$102_3$-$102_6$-$102_7$-$102_{10}$. In example, the source node $102_1$ selects the shortest route to the destination node $102_{10}$ (using the route defined by nodes $102_1$-$102_2$-$102_3$-$102_6$-$102_{10}$) as the desired route and routes the information through the ad hoc network accordingly.

At this point, the simple example of the present invention has been described where the source node, the destination node and all the intermediate nodes used to route the information between the source and destination nodes all belong to the same VLAN. Let us now explore a slightly more complex case of the present invention where the source node and the destination node belong to the same VLAN, however, all the intermediate nodes used to route the information do not belong to the same VLAN as the source and destination nodes.

Figure 6:
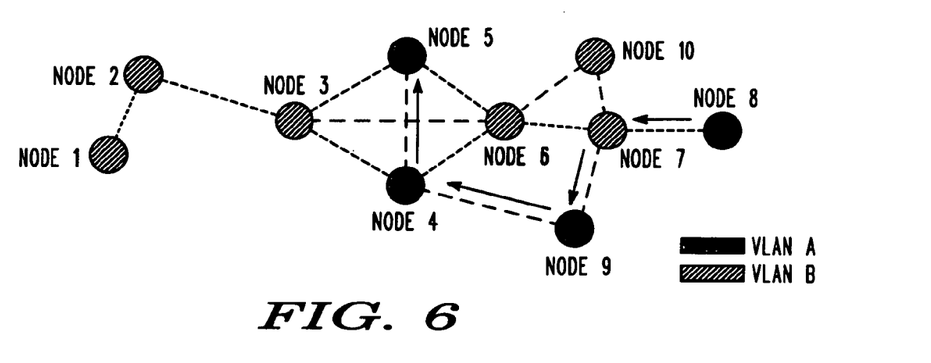
FIG. 6 illustrates an example of routing information through the wireless ad hoc network of FIG. 3, wherein at least one node used to route the information between the source node and the destination node belong to different VLAN in accordance with the present invention.

In this embodiment of this example as shown in FIG. 6, let us assume that source node $102_8$ desires to send data to destination node $102_5$. In the first embodiment, the source node $102_8$ determines the VLAN membership of the destination node $102_5$ (in this example, VLAN A), and the VLAN membership of each of its neighboring nodes in the ad hoc network. In this example, the only neighboring node for source node $102_8$ is node $102_7$, however, the source node $102_8$ identifies that node $102_7$ belongs to a different VLAN. Since node $102_7$ is the only neighboring node for the source node $102_8$, the source node $102_8$ forwards the information to node $102_7$ using a default VLAN as described above.

Upon receipt, node $102_7$ identifies that a default VLAN is used and processes the information (i.e., node $102_7$ does not ignore the information). After processing the information, node $102_7$ identifies the VLAN membership of its neighboring nodes: node $102_6$, node $102_8$, node $102_9$ and node $102_{10}$. Node $102_7$ identifies that node $102_6$ and node $102_{10}$ belong to VLAN B and node $102_8$ and node $102_9$ belong to VLAN A. Node $102_7$ determines that it has neighboring nodes belonging to the same VLAN as the source node and the destination node. As such, node $102_7$ forwards the information to node $102_9$ since node $102_9$ belongs to the same VLAN as the source node $102_8$ and destination node $102_5$.

Node $102_9$ determines the VLAN membership of its neighboring node(s): node $102_4$. Since node $102_4$ belongs to the same VLAN as the source and destination nodes, node $102_9$ forwards the information to node $102_4$ after determining the VLAN membership of its neighboring nodes as described above, which in turn forwards the information to the destination node $102_5$.

Figure 7:
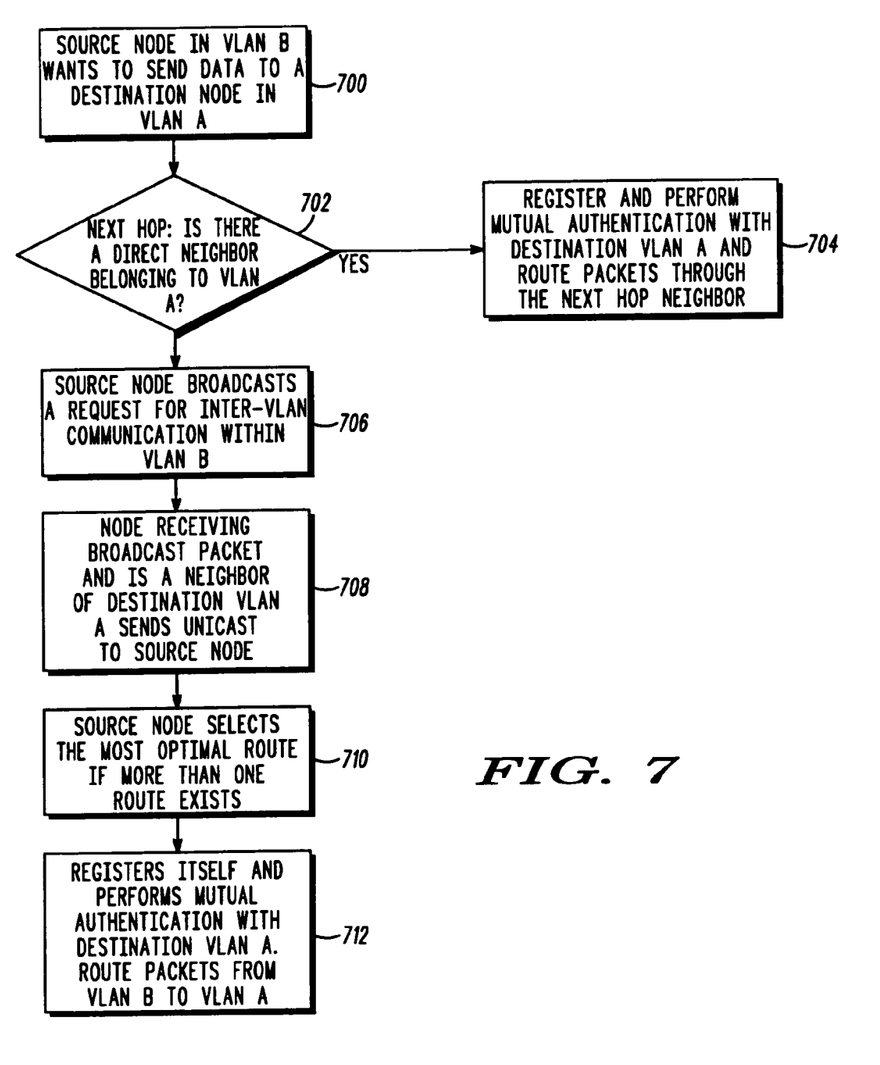
FIG. 7 illustrates a flowchart of the algorithm used for inter-VLAN communication in accordance with the present invention.

Let us now refer to FIG. 7 and discuss inter-VLAN communication. FIG. 7 illustrates a flowchart of an inter-VLAN routing algorithm for a node 102 in the ad hoc network of FIG. 3 in accordance with the preferred embodiment of the present invention. As illustrated, the source node belonging to a first VLAN desires to send information to a destination node belonging to a second VLAN (at step 700). In a first embodiment, the source node determines whether there is a neighboring node belonging to the second VLAN (i.e., the VLAN in which the destination node belongs; at step 702). If the source node identifies a neighboring node belonging to the second VLAN, the source node requests inter-VLAN communication with the second VLAN, performs a mutual authentication (either with a neighboring node in a distributed registration system or with a central managing node in a centralized registration system) and registers with the second VLAN. Upon successful authentication and registration, the node is a member of both VLANs, thus the source node forwards information to the neighboring node belonging to the second VLAN (at step 704). Upon receipt of the information, the neighboring node and the other intermediate node(s) route the information through the ad hoc network as described above in FIG. 4 using only nodes belong to the VLAN in which the destination node belongs.

If the source node, however, does not identify a neighboring node belonging to the second VLAN (at step 702), the source node broadcasts a request for inter-VLAN communication with the second VLAN to the nodes belonging to the first VLAN (at step 706). Each node belonging to the first VLAN that receives the broadcast and determines that it has a neighboring node that belongs to the second VLAN sends a unicast reply to the source node indicating that it has a neighboring node belonging to the second VLAN (at step 708). As such, the source node receives replies from the nodes in the ad hoc network belonging to the first VLAN that has neighboring nodes belonging to the second VLAN. The source node selects a desired route, if more than one exists (at step 710), and selects the node that will request inter-VLAN communication with the second VLAN. The selected node registers with the second (desired) VLAN and performs a mutual authentication with a neighboring node belonging to the second VLAN or a central managing node; the information is routed through the ad hoc network via the desired route accordingly (at step 712). Thus, it is important to note that a node can belong to multiple VLANs at any given time by registering with the multiple VLANs via the inter-VLAN method as described above, via the distributed or centralized registration processes as described above, or having multiple predefined VLANs.

Figure 8:
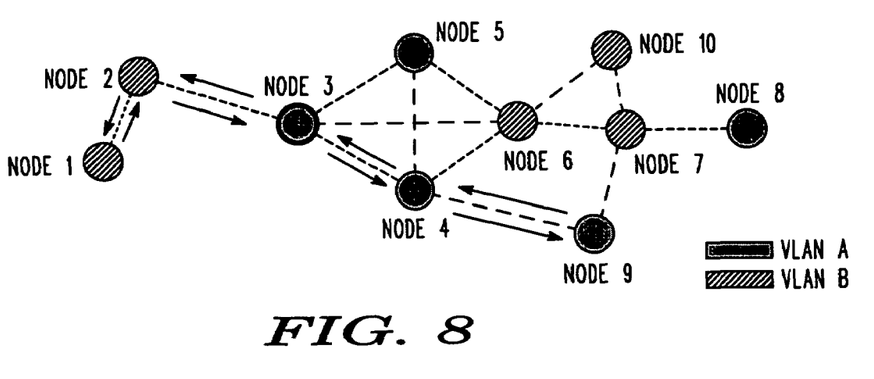
FIG. 8 illustrates an example of routing information through the wireless ad hoc network of FIG. 3, wherein the source node belongs to a different VLAN than the destination node in accordance with the present invention.

FIG. 8 illustrates an example of inter-VLAN communication. In this example, node $102_1$ desires to send information to node $102_9$. Node $102_1$ determines whether there is a neighboring node that belongs to VLAN A. Since node $102_1$ does not have a neighboring node belonging to VLAN A, node $102_1$ broadcasts an inter-VLAN request. Nodes $102_2$, $102_3$, $102_6$, $102_7$, and $102_{10}$ hear the broadcast. Nodes $102_3$, $102_6$, and $102_7$ respond to the message as having neighbors belonging to VLAN A. Node $102_1$ selects node $102_3$ as the optimum route to forward information to node $102_9$. Node $102_3$ performs mutual authentication with node $102_4$ and registers with VLAN A. Upon successful registration, node $102_3$ becomes a member of both VLAN A and B. Node $102_3$ forwards the information to node $102_4$ which in turn forwards the information to node $102_9$, the destination node.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a wireless ad hoc network comprising a plurality of nodes with each node belonging to at least one of a plurality of virtual local area networks (VLANs) comprising the wireless ad hoc network and with each node further belonging to a same default VLAN, a method comprising the steps of:

determining that a source node and a destination node belong to a same first VLAN of the plurality of VLANs that is different from the default VLAN; and identifying the first VLAN in information and routing the information to the destination node through a path in the ad hoc network using only nodes that belong to the first VLAN, if the path is available; and if the path is not available to route the information between the source node and the destination node using only nodes that belong to the first VLAN, using the default VLAN to route the information at least partially through the ad hoc network, wherein the step of using the default VLAN is performed by a node that does not have a neighboring node that belongs to the first VLAN.

2. The method of claim 1 wherein each node used to route the information independently determines through which of its neighboring nodes to route the information.

3. The method of claim 1 wherein the source node determines a desired route to route the information through the ad hoc network to the destination node.

4. The method of claim 1 wherein the VLAN to which each node belongs is predefined in the node.

5. The method of claim 1 wherein each node in the ad hoc network requests membership to a VLAN.

6. In a wireless ad hoc network comprising a plurality of nodes with each node belonging to at least one of a plurality of virtual local area networks (VLANs) comprising the wireless ad hoc network and with each node further belonging to a same default VLAN, a method comprising the steps of:

at a node belonging to a first VLAN of the plurality of VLANs that is different from the default VLAN:

determining that a destination node belongs to the first VLAN;

determining to which VLAN each neighboring node belongs; and identifying the first VLAN in information and if there is at least one neighboring node that belongs to the first VLAN, sending the information only to a neighboring node that belongs to the first VLAN; and
if there is not a neighboring node that belongs to the first VLAN, using the default VLAN to send the information to the neighboring node that belongs to the second VLAN,
at the neighboring node that belongs to the second VLAN:
determining to which VLAN each neighboring node belongs; and
if there is at least one neighboring node that belongs to the first VLAN, sending the information only to a neighboring node that belongs to the first VLAN.

7. The method of claim 6 wherein, if there is more than one neighboring node that belongs to the first VLAN, the step of sending the information only to a neighboring node that belongs to the first VLAN is based on at least one of the following: proximity to the destination node, radio frequency characteristics of the neighboring node, signal to noise ratio of the neighboring node, congestion characteristics of the neighboring node, and delay characteristics of the neighboring node.

8. The method of claim 6 further comprising the step of repeating the steps of claim 8 until the information reaches the destination node.

9. The method of claim 6 wherein the neighboring node that belongs to the second VLAN sends the information to the neighboring node that belongs to the first VLAN via the default VLAN.

10. In a wireless ad hoc network comprising a plurality of nodes with each node belonging to at least one of a plurality of virtual local area networks (VLANs) comprising the wireless ad hoc network and with each node further belonging to a same default VLAN, a method comprising the steps of:
at a node belonging to a first VLAN of the plurality of VLANs that is different from the default VLAN:
determining that a destination node belongs to a second VLAN of the plurality of VLANs that is different from both the first VLAN and the default VLAN;
determining to which VLAN each neighboring node belongs;
authenticating with a node to register with the second VLAN; and
identifying the second VLAN in information and sending the information only to a neighboring node that belongs to the second VLAN; and
if there is not a neighboring node that belongs to the first VLAN, using the default VLAN to send the information to the neighboring node that belongs to the second VLAN,
at the neighboring node that belongs to the second VLAN:
determining to which VLAN each neighboring node belongs; and
if there is at least one neighboring node that belongs to the first VLAN, sending the information only to a neighboring node that belongs to the first VLAN.

11. The method of claim 10 wherein the node registers with the second VLAN via a neighboring node that belongs to the second VLAN.

12. The method of claim 10 wherein the node registers with the second VLAN via a central managing node.

13. In a wireless ad hoc network comprising a plurality of nodes with each node belonging to at least one of a plurality of virtual local area networks (VLANs) comprising the wireless ad hoc network and with each node further belonging to a same default VLAN, a method comprising the steps of:
determining that a source node and a destination node belong to a same firs VLAN of the plurality of VLANs that is different from the default VLAN:
determining whether a route between the source node and the destination node using only nodes that belong to the first VLAN; and
if there is at least one route between the source node and the destination node using only nodes that belongs to the first VLAN, sending information through the ad hoc network along a selected one of the at least one routes between the source node and the destination node using only nodes that belongs to the first VLAN;
if there is not a route between the source node and the destination node using only nodes that belong to the first VLAN, sending the information through the ad hoc network along a route between the source node and the destination node using a highest percentage of nodes that belong to the first VLAN;
identifying the first VLAN in the information and using the default VLAN to route the information through the nodes in the route that belong to a different VLAN than the first VLAN.

14. The method of claim 13 further comprising the step of identifying a set of one or more nodes that will use the default VLAN to route information along the route.

15. In a wireless ad hoc network comprising a plurality of nodes with each node belonging to at least one of a plurality of virtual local area networks (VLANs) comprising the wireless ad hoc network and with each node further belonging to a same default VLAN, a method comprising the steps of:
determining that a source node belongs to a same first VLAN of the plurality of VLANs that is different from the default VLAN, and a destination node belongs to a second VLAN of the plurality of VLANs that is different from both the first VLAN and the default VLAN;
determining a route between the source node and the destination node using a highest percentage of nodes that belong to the second VLAN; and
sending information between the source node and the destination node through the ad hoc network along the route; and
if there is not a neighboring node that belongs to the first VLAN, using the default VLAN to send the information to the neighboring node that belongs to the second VLAN,
at the neighboring node that belongs to the second VLAN:
determining to which VLAN each neighboring node belongs; and
if there is at least one neighboring node that belongs to the first VLAN, sending the information only to a neighboring node that belongs to the first VLAN.

16. The method of claim 15 further comprising the step of authenticating with a node to register with the second VLAN.

17. In a wireless ad hoc network comprising a plurality of nodes with each node belonging to at least one of a plurality of virtual local area networks (VLANs) comprising the wireless ad hoc network and with each node further belonging to a same default VLAN, a method comprising the steps of:
at a first node;

identifying a first VLAN of the plurality of VLANs that is different from the default VLAN in which the first node belongs;

determining that a destination node belongs to a second VLAN of the plurality of VLANs that is different from both the first VLAN and the default VLAN;

determining that the first node has a neighboring node belonging to the second VLAN;

authenticating to a node to register with the second VLAN; and sending information from the first node to the destination node through the ad hoc network using only the nodes that belong to the second VLAN;

if there is not a route between the source node and the destination node using only nodes that belong to the first VLAN, sending the information through the ad hoc network along a route between the source node and the destination node using a highest percentage of nodes that belong to the first VLAN;

identifying the first VLAN in the information and using the default VLAN to route the information through the nodes in the route that belong to a different VLAN than the first VLAN.

* * * * *